US007873638B2

(12) United States Patent
Young et al.

(10) Patent No.: US 7,873,638 B2
(45) Date of Patent: Jan. 18, 2011

(54) APPARATUS AND METHOD FOR THE COLLECTION AND UTILIZATION OF USER SELECTION IN A CONTENT DELIVERY ENVIRONMENT

(75) Inventors: Ken Young, Kanata (CA); Gary Southwell, Westford, MA (US); Mike Drew, Woodlawn (CA); Tim Jenkins, Kinburn (CA); Morteza Ghodrat, Kanata (CA); Martin Bijman, Stittsville (CA)

(73) Assignee: Ciena Corporation, Linthicum, MD (US)

( * ) Notice: Subject to any disclaimer, the term of this patent is extended or adjusted under 35 U.S.C. 154(b) by 138 days.

(21) Appl. No.: 11/228,220

(22) Filed: Sep. 19, 2005

(65) Prior Publication Data

US 2006/0080360 A1  Apr. 13, 2006

Related U.S. Application Data

(60) Provisional application No. 60/610,547, filed on Sep. 17, 2004.

(51) Int. Cl.
*G06F 7/00* (2006.01)
*G06F 17/30* (2006.01)
*G06F 15/173* (2006.01)
*H04B 1/66* (2006.01)
*H04N 7/12* (2006.01)
*H04N 11/02* (2006.01)
*H04N 11/04* (2006.01)

(52) U.S. Cl. .................. 707/736; 375/240.1; 709/224
(58) Field of Classification Search .............. 707/104.1, 707/102; 370/432
See application file for complete search history.

(56) References Cited

U.S. PATENT DOCUMENTS

| 6,266,339 | B1 * | 7/2001 | Donahue et al. ............ 370/432 |
| 6,421,356 | B2 * | 7/2002 | Carter et al. ................ 370/468 |
| 6,850,252 | B1 * | 2/2005 | Hoffberg .................... 715/716 |
| 7,020,704 | B1 * | 3/2006 | Lipscomb et al. ........... 709/226 |
| 7,363,643 | B2 * | 4/2008 | Drake et al. .................. 725/34 |
| 2002/0078441 | A1 * | 6/2002 | Drake et al. ................... 725/9 |
| 2003/0159157 | A1 * | 8/2003 | Chan .......................... 725/151 |
| 2004/0221029 | A1 * | 11/2004 | Jenkins et al. ............... 709/223 |
| 2005/0193010 | A1 * | 9/2005 | DeShan et al. ........... 707/104.1 |
| 2006/0015928 | A1 * | 1/2006 | Setty et al. .................. 725/148 |

OTHER PUBLICATIONS

Quinn et al, IP Multicast Applications: Challenges and Solutions, Sep. 2001, Network Working Group, RFC 3170, Sections 2.1.1, 3.2.*
Digital Loop Carrier, HTML, Apr. 14, 2009, wikipedia.org, http://en.wikipedia.org/wiki/Digital_loop_carrier (Accessed: Jun. 17, 2009).*
Broadband Loop Carrier: Enabling Video in a Triple-Play Architecture, HTML, 2007, International Engineering Consortium, http://www.iec.org/online/tutorials/bb_loop/index.asp, Overview and p. 2 (Accessed: Jun. 17, 2009).*

* cited by examiner

*Primary Examiner*—Pierre M Vital
*Assistant Examiner*—Jason Liao
(74) *Attorney, Agent, or Firm*—Clements Bernard PLLC; Christopher L. Bernard; Tyler S. Brown

(57) ABSTRACT

A system and method for the collection, analysis, utilization, and/or reporting of user preference of content experienced by the user preferably for managing the distribution network of a content delivery environment, managing the selections of content available, reporting user selections of content available, and/or execution of user instructions as presented in the content.

17 Claims, 4 Drawing Sheets

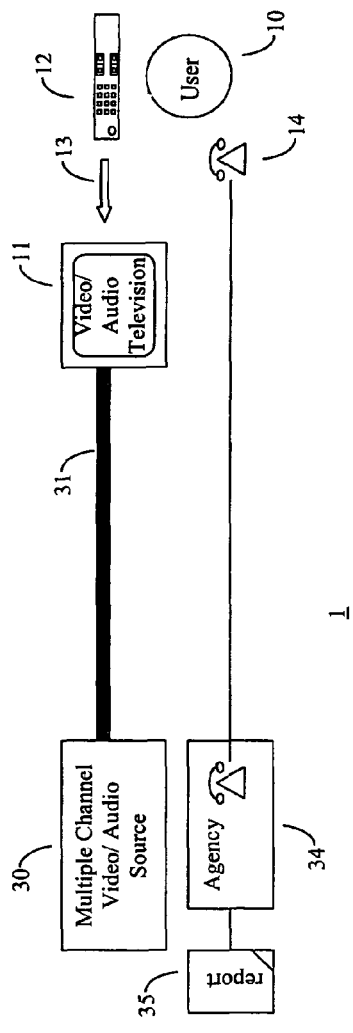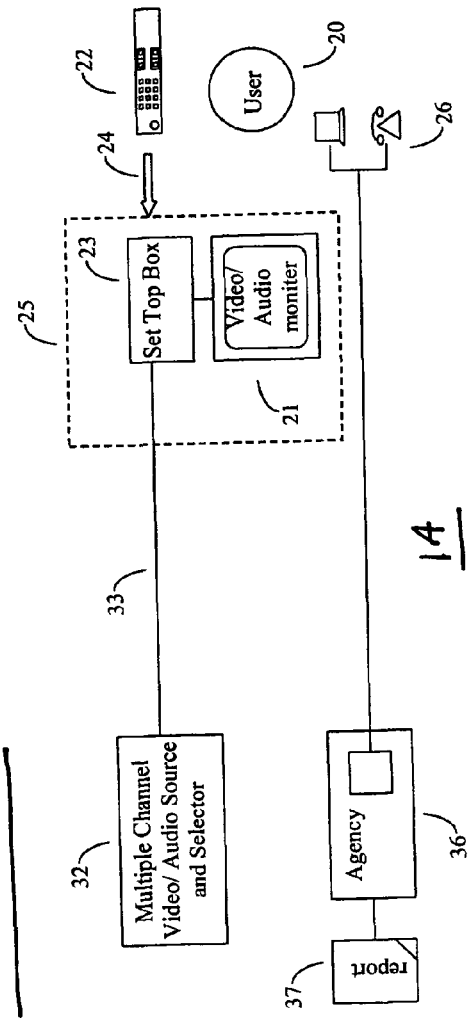

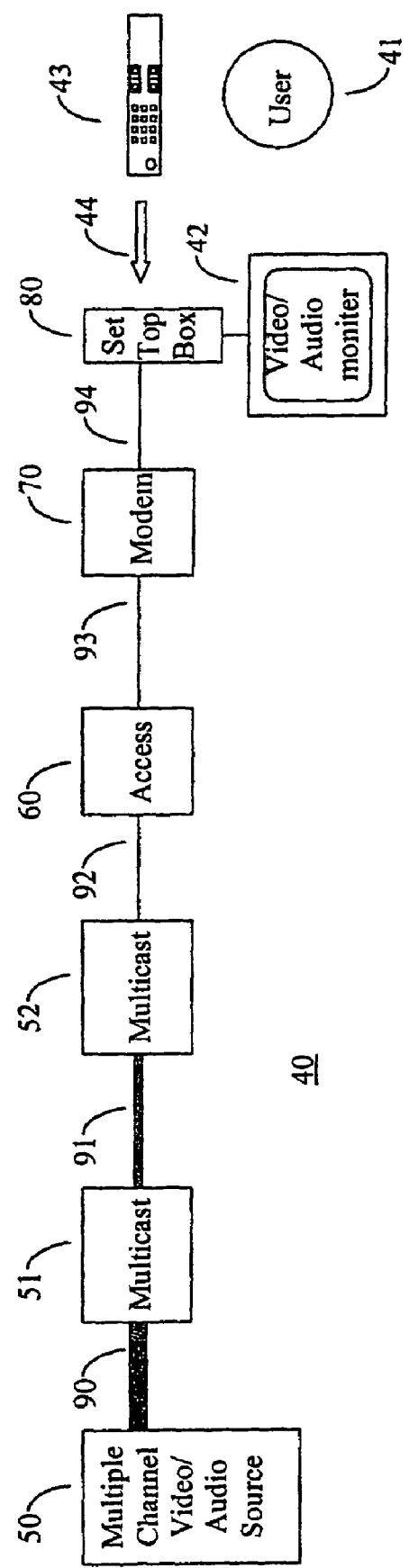

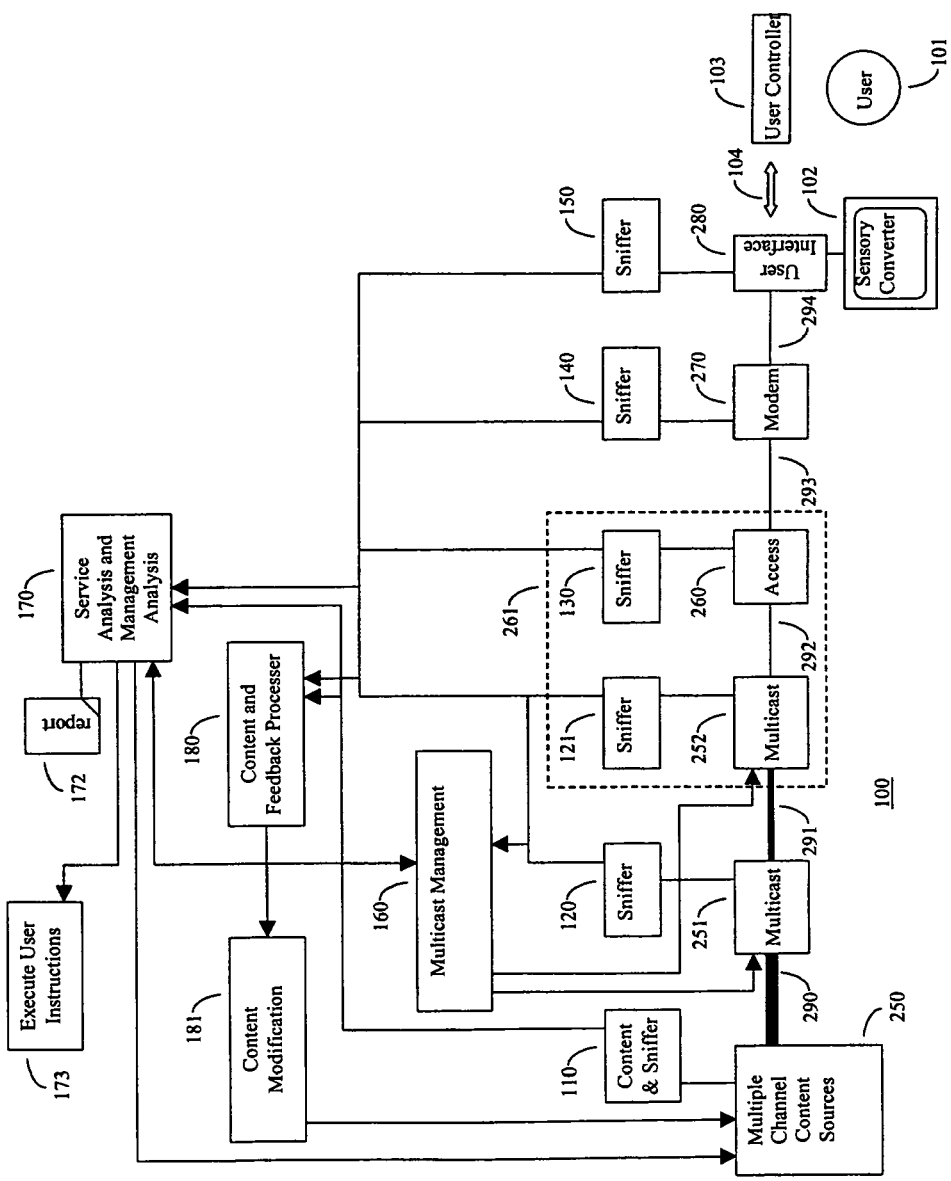

US 7,873,638 B2

APPARATUS AND METHOD FOR THE COLLECTION AND UTILIZATION OF USER SELECTION IN A CONTENT DELIVERY ENVIRONMENT

RELATED APPLICATION

The subject patent application is related to and claims priority from U.S. patent application Ser. No. 60/610,547 filed on Sep. 17, 2004 under 35 USC §119(e)(1).

FIELD OF THE INVENTION

The present invention relates generally to communication networks and ratings collection, and specifically to a system and method for the collection, analysis, utilization, and/or reporting of user preference of content experienced by the user, for the purposes of managing the distribution network of a content delivery environment, managing the selections of content available, reporting user selections of content available, and/or execution of user instructions as presented in the content.

BACKGROUND OF THE INVENTION

In content delivery environments, representations of video and audio are transmitted from a source, carried over a transmission medium to converters that create the physical video and audio to be experienced by users. These users have preferences for certain content or behaviours in response to certain content that is exercised by making choices from among a wide selection of different available content.

Content Providers are motivated to learn the patterns of user preference and opinion of certain content so that in competition with other Content Providers they may gain a greater percentage of user attention on aggregate, and to gain user attention when attempting to deliver specific messages, for example, the point of a story, or a commercial message to induce the user to request or purchase products.

The Content Providers may employ agencies to telephone a statistically relevant sample of the user population to verbally or through interactive questionnaires collect responses that may upon analysis suggest user preference for certain content.

The Content Delivery Providers and user preference opinion collection Agencies deliver the content and receive the preference feedback through a number of different media. Referring to FIGS. 1 and 1A, two examples of a Content Delivery Network and user feedback collection apparatus are illustrated generally by reference characters 1 and 1A.

User 10 may watch or listen to Video/Audio Television 11 and make selections using Controller 12 which communicates to Television 11 by some means 13 that may be wired, infrared, or wireless for example. Content is provided from a Multiple Channel Video/Audio Source 30 that contains multiple channels of content and is delivered to Television 11 through medium 31 which carries all the content from Source 30 to Television 11 which may tune any one of the multiple channels of content as per user selection. Medium 31 is typically coaxial cable and may be some other high bandwidth mechanism such as optical or satellite transmission for example that is capable of carrying hundreds of channels in various formats. An example of such an apparatus is broadcast television, which is widely deployed.

Alternatively User 20 may watch or listen to Video/Audio Moniter 21 and make selections using Controller 22 which communicates with Set Top Box 23 by some means 24 that may be wired, infrared, or wireless for example. Subsequently Set Top Box 23 signals Multiple Channel Audio/Video Source 32 to tune any one of multiple channels of content as per user selection. Set Top Box 23 and Monitor 21 may be combined as a single product 25. Content is provided from a Source 32 to Set Top Box 23 though medium 33 which carries only the selected content from Source 32. Set Top Box 23, in turn, either passes the content signal to Monitor 21 or may convert the content signal from the format carried on medium 33 to the format inputted into Monitor 21. Medium 33 is typically a twisted pair copper loop enabled for moderate data transmission rates of approximately less than 50 MB/s using for example DSL transmission techniques, and may be some other moderate bandwidth medium such as cable, optical, wireless, or satellite transmission for example. An example of such an apparatus is video on demand (VOD), which is currently not widely deployed.

Agency 34 and Agency 36 are motivated to collect user opinion of the multiple channels from Source 30 and Source 32. Agency 34 may typically on a period of greater than many hours telephone 14 a statistically relevant sample of the user population to verbally ask subjective questions of the users like User 10 to collect responses that may upon analysis suggest user preference for certain content and be summarized in Report 35. Alternatively Agency 36 on a similar period may employ electronic means 26 such as telephone touch pad detection signalling or computer-based internet questionnaire for example to question users like User 20 to collect responses that may be processed by an algorithm to suggest user preference for certain content and be summarized in Report 37. Either method of collecting user preference may be employed on Users 10 or User 20. Public agencies that employ such collection of user opinion include Nielsons, Arbitron, and Q-Score.

Further, a new distribution network model is emerging for the delivery of video/audio content that employs transmitting only as much content to each subsequent distribution point in a Content Delivery Network as is needed to ensure the users are provided their selected content. Referring to FIG. 2, an illustration of a Content Delivery Network and user input feedback collection apparatus are illustrated generally by numeral 40.

User 41 may watch or listen to Video/Audio Monitor 42 and make selections using Controller 43 which communicates with Set Top Box 80 via some means 44 that may be wired, infrared, or wireless for example. Subsequently, Set Top Box 80 signals Multiple Channel Video/Audio Source 50 to provide, among the content it transmits, the user selection. Content is provided from Source 50 to Set Top Box 80 though numerous network elements to be subsequently described until the specific content is provided to Set Top Box 80 which either passes the content signal to Monitor 42 or may convert the content signal from the format carried on medium 94 to the format inputted into Monitor 42. The numerous network elements represent multiple points in the Content Delivery Network where, for example, all channels are transmitted on medium 90 to Multicast element 51, which has determined a state from sensing user selection feedback to transmit only the channels that are needed on medium 91. Further, numerous additional multicast elements may exist in the network, until the final Multicast element 52 transmits the limited number of channels on medium 92 as needed by users supplied by Access element 60. Access 60 transmits the content over medium 93 that represents the last mile medium between the service provider and the subscriber environment, the content is received and may be converted by Modem element 70 if such an element is needed, over subscriber environment network 94 to Set Top Box 80. Medium 90, 91, and 92 may be a high bandwidth medium such as cable, optical, ethernet transmission medium carrying SONET, ATM, or internet protocol capable of carrying hundreds of channels in various formats. Medium 93 may be for example one of either a copper loop enabled with DSL protocol, cable, optical, wireless, or satellite transmission. Medium 94 may be a network in a user's environment such as cable, wireless, or Ethernet. An example of such an apparatus is referred to as a multicast network.

The multicast elements Multicast 51 and Multicast 52 employ a method of detecting the signals received from the user to determine the users content selection and alter their state to ensure the content selection is among the set of channels transmitted toward the user. For example, in internet protocol transmission networks, one of several protocols including internet group managed protocol (IGMP) may be employed. As such, the Multicast blocks are responsible for channel changing.

In current deployments, Set Top Box 80 is provisioned with the access policy for User 41. The Access policy is the list of content channels that a particular user may have access to. User 41 may not access content outside of this policy. Implementing access policy is recognised to be flawed and has led to issues in Content Delivery Networks such as satellite. To alleviate this service delivery loophole, the implementation of the subscriber's access policy must be moved from the subscriber's home. One possible location that has been discussed by standards bodies is to move the access policy to the multicast network element. As such, Multicast 52 may have provisioned access policy describing the content that is allowed on media 92.

The performance of this multicast network and response time to user selections may affect the user's opinion of the content and the Content Delivery Provider. Such a transmission network for example may be based on internet protocol or on a closed circuit transmission network owned by the Content Delivery Provider, as may be deployed for IPTV for example, which is just emerging and not widely deployed.

Content Providers, Content Delivery Providers, and user opinion collection Agencies are all motivated to gain a larger share of user attention on aggregate and at key moments, and to gain user attention while investing minimally or optimally in the network apparatus, however there are numerous disadvantages to the current apparatus and method. Without real time user selection information and models, the content delivery network must be designed with excess channel capacity to provide for the assumed demand for a wide range of content to numerous users. Current methods of collection of user selection opinion is based on subjective questions, and is collected typically many hours after the user has watched the content, thus is not specific and prone to error, making it difficult to assess demand, plan for, and deliver, or to remove, the range of multiple content channels available to the user, or to provide content providers input on the type of content is attention grabbing, thus what content to develop and deliver. Opportunities are missed to execute specific instructions as selected by the user from among several options presented in the content, such as requesting or purchasing new content or products associated with the content being transmitted and experienced by the user.

It is an object of the present invention to obviate or migrate at least some of the above mentioned disadvantages.

SUMMARY OF THE INVENTION

In accordance with several aspects of the present invention, there is provided an apparatus which makes up the content delivery network that will receive the key attributes of the content being presented; detect and report the user input feedback and its timing; to analyse and use the current user input feedback instantly, on aggregate, or as statistically predicted to be needed periodically, to manage the delivery of the range of multiple channels to make available at various points in the content delivery network, or modify the content instantly based on user input feedback from a user or pool of users; and method to analyse and utilize the user input feedback of the content channels to instantly, on aggregate, or as statistically predicted to be needed periodically, to manage the availability of certain content channels from a multiple channel content source; to execute specific instructions based on user input feedback from among several options that are presented or available to the user; and provide feedback via a report on the user selection of experienced content in several gradients, including, of precise content based on their immediate content selections, which may be used to modify the content or range of content available, and, of content on aggregate based on a statistically analysis of user selection feedback.

BRIEF DESCRIPTION OF THE DRAWINGS

Embodiments of the present invention will now be described by way of example only, with reference to the following drawings in which:

FIG. 1 is a block diagram representing an existing distribution network for delivery of content and collection of user opinion (prior art);

FIG. 1A is a block diagram representing an existing distribution network for delivery of content and collection of user opinion (prior art);

FIG. 2 is a block diagram representing an emerging distribution network for delivery of content (prior art);

FIG. 3 is a block diagram representing a new distribution network in accordance with a preferred embodiment of the present invention; and, FIG. 4 is a block diagram depicting in greater detail the Multicast Management element of FIG. 3.

DETAILED DESCRIPTION OF THE PREFERRED EMBODIMENTS

Figure 4:
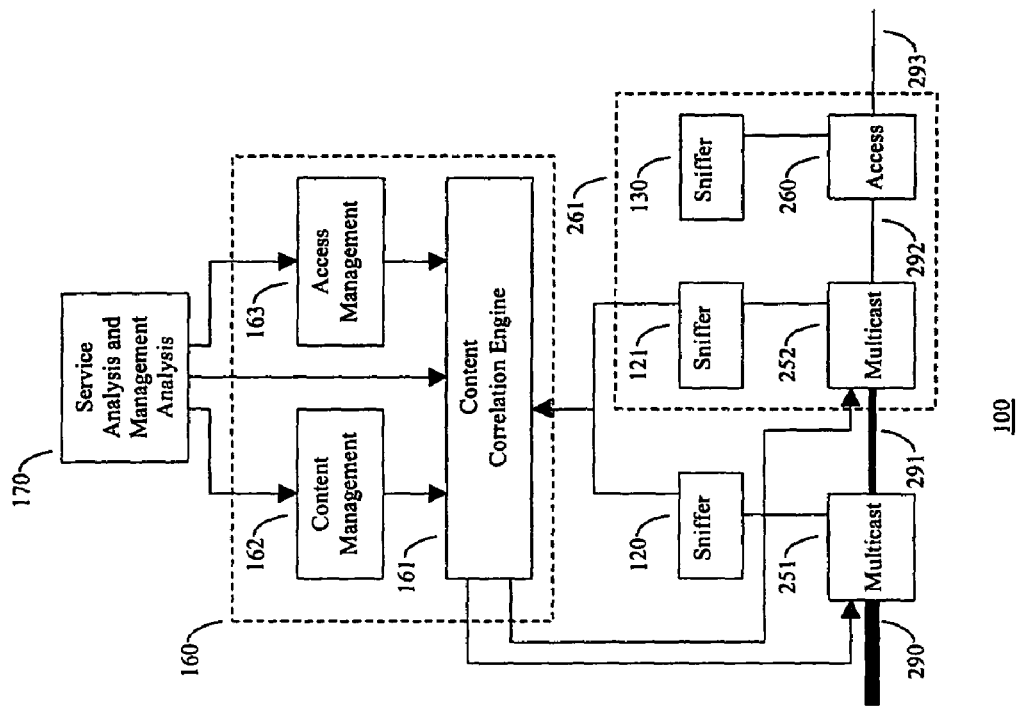

The preferred forms of the invention will be described with reference to FIGS. 3 and 4. The appended claims are not limited to the preferred forms and no term and/or phrase used herein is to be given a meaning other than its ordinary meaning unless it is expressly stated that the term and/or phrase shall have a special meaning. For convenience, like numerals in the description refer to like structures in the drawings.

The most preferred form of the invention adds components to various elements of the admitted prior art to improve the content delivery network to allow the network to collect and utilize user input feedback, and correlate the user input feedback to the content being presented. The elements in the content delivery network that are emerging as represented in FIG. 2 are the elements Multicast 51 and Multicast 52. Thus, the most preferred form of the invention will be described by adding components to these elements first, then described subsequently by adding components to other elements as per further aspects of the invention.

Referring to FIG. 3, an alternate distribution network is illustrated generally by numeral 100. Downstream signalling flows generally from medium 290 towards medium 294, and upstream signalling flows generally from medium 294 towards medium 290. User 101 experiences content transmitted by Sensory Converter 102 and makes selections using User Controller 103, which may be interfaced to the user by contact, sound, motion detectors such as for eye motion, body suit, or human implants for example. Controller 103 communicates with User Interface 280 via some means 104 that may be wired, infrared, or wireless for example. Subsequently, Interface 280 signals the user selection upstream to Multiple Channel Content Sources 250 to provide among its transmissions the content suitable for the user selection. Content is provided from Sources 250 to Interface 280 though numerous network elements to be subsequently described until the specific content is provided to Interface 280 which either passes the content signal to Sensory Converter 102 or may convert the content signal from the format carried on medium 294 to the format inputted into Sensory Converter 102. The numerous network elements represent multiple points in the Content Delivery Network where, for example, all channels are transmitted on medium 290 to Multicast 251, which has determined a state from sensing user selection feedback to transmit only the channels that are needed on medium 291. Further, numerous additional multicast elements may exist in the network, until the final Multicast 252 transmits the limited number of channels on medium 292 as needed by users supplied by Access 260.

Multicast 252 and others may be combined in one piece of network apparatus with medium 292, Access 260 and new elements Sniffer 121 and Sniffer 130 to be contained in a Broadband Loop Carrier (BLC) 261. Access element 260 transmits the content over medium 293 that represents the last mile medium between the service provider and the subscriber environment, and carries all content as selected by all users in the subscriber environment. The content is received and may be converted by Modem 270 if such an element is needed. The content is transmitted over subscriber environment network 294 to Interface 280 where the content specifically for User 101 is extracted. Medium 290, 291 may be a high bandwidth medium such as cable, optical, ethernet transmission medium carrying SONET, ATM or internet protocol capable of carrying hundreds or thousands of channels in various formats. Medium 292 may be a similar medium or for example the interconnection electronics of a piece of network equipment, as in the example of BLC 261. Medium 293 may be for example one of either a copper loop enabled with DSL protocol, cable, optical, wireless, or satellite transmission Medium 294 may be a network in a user's environment such as cable, wireless, or Ethernet.

In yet another aspect of the present invention, viewer profiles may be entered such that when a particular user is viewing content and begins to provide user feedback, that user may identify himself or herself with User Controller 103, or the viewer may be detected and recognized by User Controller 103. This allows the user input feedback to be categorized for the purposes of reporting viewer patterns and demographics with respect to the content experienced.

The multicast elements Multicast 251 and Multicast 252 employ a method of detecting the signals received from users such as User 101 to determine the user selection and alter their state to ensure the content selection is among the set of channels transmitted toward the user. For example, in internet protocol transmission networks, one of several protocols including internet group managed protocol (IGMP) may be employed. As such, the Multicast blocks are responsible for channel changing. As part of this channel changing function, Multicast 251 and Multicast 252 can decide to which content User 101 may access. User 101's access policy can be downloaded as part of provisioning the multicast element.

Multicast blocks such as Multicast 251 and Multicast 252 for example as part of its IGMP functionality extracts in real time the user input. In one aspect of the present invention, a Sniffer 120 and Sniffer 121 are added respectively to extract and report all user input as transmitted from the User Controller 103 to the User Interface 280. Further, the multicast blocks are improved with an additional input from Multicast Management 160 which instructs the multicast blocks what additional channels should be added to the set of content transmitted further downstream.

In yet another aspect of the present invention, Multicast Management 160 is added to receive all user input as collected by the multicast blocks and detected and reported by the sniffer blocks; filter the user input to inputs that are of relevance to this block; process the information; and outputs instructions to the multicast blocks.

Thus with the loop consisting of the modified Multicast blocks 251 and 252, Sniffer blocks 120 and 121 respectively, and Multicast Management 160 there is provided a Multicast Management environment where the sets of content on subsequent mediums such as Medium 291 and Medium 292 may be control. As such, the traffic management of the Content Delivery Network is achieved. Multicast Management 160 may reside physically in any one of these blocks, and communicate with the other blocks using virtual circuits through medium 291, through equipment interconnect, or may reside in a completely separate location where all communication is carried out by virtual circuits, for example, through the public packet network.

As shown in FIG. 4, Multicast Management 160 manages access and content data. Content Management 162 defines all the content which could be accessed within this Content Delivery Network. It programs the Content Correlation Engine 161 to recognize the content being accessed by users in the events received from Sniffer blocks 120 and 121. Access Management 163 organizes the users such as User 101, which are members of this multicast network, in that it programs the Content Correlation Engine 161 to recognize events from User 101 via Sniffer blocks 120 and 121. It can specifically recognize User Interface 280 and correlate this to User 101. It also provides a list of acceptable content for this user. This policy is downloaded to Multicast 251 to ensure that User 101 is not attempting to access content which has not been authorized by the Content Network Provider. As well, if User 101 adds another User Interface 280 within the user environment, this interface can be prevented from accessing any content until this interface is enabled by the Content Delivery Network.

The Content Correlation Engine 161 can track the real-time state of the Content Delivery Network. By tracking the status, Multicast Management 160 uses the following methods to implement traffic management and improvements to the Content Delivery Network. Smart channel caching is implemented based on user selection history, processing the user selections on an adaptive model to predict what content is needed periodically, ensures the content is present when it is anticipated users will periodically demand it. To improve fast channel changing speed, when a channel selection is made, the adjacent channels or those channels that have been statistically observed based on previous user input to be the next selected channels when a user is scanning though the channel lineup in search of new content to view may be immediately requested to be present at the last multicast element that serves the user. By providing a management interface from the Content Provider or Content Delivery Provider, the Content Correlation Engine 161 can be programmed with the date and time of special events (Superbowl, Academy Awards, etc.) which will be prioritized over the historical requirements as previously determined by the multicast network. To limit the capacity needs of each subsequent medium in the Content Delivery Network, periodically the unused channels at each multicast element can be released, where releasing priority is given to the channel that has not been used for the longest time. As a benefit of these methods, the transmission network capacity may be managed or minimized.

In yet another aspect of the present invention, the user input feedback would be provided to Service Analysis and Management Analysis 170. In the prior art, the user input information is either generally not available, as in FIG. 1 where channel selection occurs on Television 11, or is held privately as part of a closed-circuit distribution network model as in FIG. 2 where channel selection occurs in Multiple Channel Video/Audio Source and Selector 32. In the emerging network, the user input feedback is now available at various points in the Content Distribution Network. In a multicast network, as in FIG. 3, Multicast 252 has functionality to detect the user selection. As described earlier as an aspect of the present invention, Sniffer 121 detects and reports user input feedback information, and thus is an optimal point in the Content Delivery Network to provide the user input feedback to Service Analysis and Management Analysis 170. The user input feedback is available at other elements further upstream in the Content Delivery Network. Thus it is a further aspect of this invention, that Access 260, Modem 270, and User Interface 280 would have added characteristics to detect the user input feedback, and through Sniffer 130, Sniffer 140, and Sniffer 150 respectively, detect and report the user input feedback to Service Analysis and Management Analysis 170. The user input feedback may be terminated at Multicast 252, but may be configured to pass further downstream to subsequent multicast blocks and potentially the Multiple Channel Content Sources 250, in such case, Sniffer 120 and Content and Sniffer 110 respectively, detect and report the user input feedback to Service Analysis and Management Analysis 170. It is not necessary for all these blocks to be modified to provide the user input feedback, only that at least one provide the information, to allow Service Analysis and Management Analysis 170 to fulfill its purpose.

In yet another aspect of the present invention, Multiple Channel Content Sources 250 have the added characteristic to have stored or detectable the nature of the content on all the available multiple channels available to users, which shall be named in its entirety the Content Description, and have stored or detectable the precise timing of the Content Description. The Content Description and its respective timing is detected by Content and Sniffer 110, and reported or transmitted in real time and synchronized to its transmission by Multiple Channel Content Sources 250 to Service Analysis and Management Analysis 170.

The Service Analysis and Management Analysis 170 will use the following methods to implement input filtering, processing, content selection, content requests, execute user instructions, and generate user selection reports that may be provided to Content Providers or sold openly. The block may receive from various elements in the Content Delivery Network the following input information: detectors to indicate if a user is in the vicinity of a set top box; when is a set top box on or off; how long and when a channel is used; number of set top boxes thus monitors active per subscriber environment.

The block may receive from the user the following input information: broadcast channel joined, broadcast channel left, access policy violation, new user interface detected. The block may filter and ignore the input information to restrict input from certain users under certain conditions: user is not part of analysis group, or channel is not of interest. The block may collect information from a large group of users before conducting analysis to create a statistical representation of the user input feedback without violating the privacy of individual users as may be requested by users or required by law. The block may correlate the user input feedback and Content Description to create statistical databases and reports to indicate the user selection behaviours of a specific set of users, for example, by neighbourhood, or time of day such as mornings or prime time. This processing produces a database entry capturing the full state of which channels or selections are being viewed regularly, for example as frequently as every second. The block may determine and provide to Multicast Management 160 a list of the top several channels that are viewed at different times of day, such that Multicast Management 160 would ensure this content is present and thus readily available to users when this content is in demand. The block may process the input information to filter out certain recognizable behaviour patterns that are not relevant to the collection of viewer preference reports: surfing through channels rapidly to get to a new target channel; surfing slowly through channels to view each channel briefly in search of a new channel that the user may wish to experience; a user interface which has had no activity for an unusually long time. The block synchronizes, correlates, and indexes the input information with the content information provided ultimately by Content and Sniffer 110, to generate the following information: number of viewers watching specific content; historical viewing of a show; characteristics of viewers as identified by user profiles or detected by User Controller 103 (for advertising purposes) or by user demographics; response to certain content by identifying the number of viewers who stayed, and the number of viewers who left, for example, where the content is advertisements.

Service Analysis and Management Analysis 170 may process the content and user input feedback data to generate historical data of content access, which can be used to modify the content provided by Multiple Channel Content Sources 250. Channels that are not heavily used could be dropped from the channel lineup available from Multiple Channel Content Sources 250, avoiding expensive licence fees to access this content. As well, new content can be added to the channel lineup, and then be correlated to the Multicast Management 160.

As part of the data collection above, the Service Analysis and Management Analysis 170 can detect access violations from a particular subscriber. This could involve a user adding an additional User Interface 280 into the user environment network 294. If the Interface 280 is not authorized for service, Management 160 will not enable service from the multicast network elements. This user can be prompted to enable the user interface for a fee (if required) and have the amount added to their bill. Another access violation scenario involves the user pulling content which is not part of their service profile. As a result, the user could be provided limited access for a period of time, for example, a preview for 5 minutes, or service for a period of time. At the end of this period, a screen indicating that this service can be continued for a fee can be provided. Access violations may also be in the form of parental controls. Using input from the User Interface 280, the access policy for User 101 can be modified. This can disable various content from being provided to the User Interface 280 until it is re-enabled via a similar process.

In yet another aspect of the invention, summary information as processed by Service Analysis and Management Analysis 170 may be prepared for transmission or sale to $3^{rd}$ parties in the form of a Report 172. The report may detail number of viewers watching a show, historical viewing of a show, and rejection of a show at particular times. Internal reports may also be generated, including for example, content analysis for licensing purposes, or bills for subscribers.

In yet another aspect of the invention, when content is provided that presents to the user a selection to execute a specific instruction generally to $3^{rd}$ party providers of goods or services other than the Content Delivery Provider, that Service Analysis and Management 170 sends Execute User Instructions 173 signals that represents instructions in accordance with profiles as required for the interface of Execute User Instructions 173. Such instructions may include the purchase of goods or services as described in the content and charge information, and preferred shipping and shipment dates, or, transmission of the user input feedback directly to the $3^{rd}$ party provider for some other purpose as described in the content that the user has responded to.

Using the ability to generate Report 172 in conjunction with Execute User Instructions 173, the effectiveness with which content attracts user attention can be specifically measured. Report 172 can report the specific times specific content has been shown, the proportion of viewers who remained to view the content, and the proportion of viewers who requested new content during viewing and thus did not complete viewing the content. A sample from both groups could be polled using Execute User Instructions 173 to access the general response to the content. For advertising content for example, this information may be useful to advertising firms and the product manufacturer.

In yet a further aspect of the invention, specific content that may be viewed and user input feedback collected from one or many users may be sent to Content and Feedback Processor 180. Content and Feedback Processor 180 has the characteristic to adapt and modify a specific content channel in response to user input feedback, for many purposes, for example, providing interactive menus to solicit user feedback of content, to complete questionnaires, to generate auto attendants to solicit user feedback of content, to generate artificial intelligence companions for the user or users, for the execution of a game that one or many users participate with in real time. Processor 180 processor the current content state, the user input feedback, and its application to rules and a processing model to generate incrementally new content that is created by Content Modification 181, and presented to Multiple Channel Content Sources 250 for transmission to users. The auto attendant or questionnaires may for example be a modification of a channel that is generally available for all users but is modified only for a specific user in accordance with the user's specific user input feedback.

Since the Content and Feedback Processor 180 actively interacts with the user for the purposes described above, it can also implement video on demand (VoD) and personal video recorder (PVR) services. The user can access a specific channel which lists all recorded content or VoD movies. After the user selects and begins viewing the selected content, signals from User Controller 103 can modify the content delivered. For example, the content could be paused, fast forwarded, deleted, etc. Additionally, a new content channel may be created by combining several of the available content channels, providing for example, picture in picture content on a channel.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A content delivery network for transmitting multiple channels of content; said network comprising:
    (a) a multiple channel source for generating multiple channels of content;
    (b) a user interface for receiving one or more user input from one or more users;
    (c) a detection and reporting member comprising one or more sniffers distributed in the network for detecting and reporting in real time one or more users' preference of content based on user input from the one or more users, wherein each of the multiple channel sources and the user interface comprise one of the one or more sniffers;
    (d) at least one multicast element and a transmission medium operably connected to said at least one multicast element and to said multiple channel source, and wherein said detection and reporting member is operably connected to said multicast element with a sniffer of the one or more sniffers at the at least one multicast element; and
    (e) a service analysis and management analysis system configured to receive the user input from the one or more users and to provide statistical reports of content utilized by each of the one or more users, wherein said service analysis and management analysis system is further configured to correlate the user input and content description to create statistical databases and report of the one or more users behaviors of a specific set of one or more users, wherein said service analysis and management analysis system comprises filtering to remove recognizable behavior patterns not relevant to managing the content delivery network, and wherein said service analysis and management analysis system is separate from said user interface;
    wherein one of said one or more sniffers is contained in a broadband loop carrier, each of said sniffers is configured to extract in real time said one or more user input using Internet Group Managed Protocol (IGMP) functionality, and wherein data on the transmission medium is controlled responsive to extracted user input from the sniffers.

2. A network as recited in claim 1, further including:
    (a) an intermediate element operably connected to said multiple channel source and to said detection and reporting member, the intermediate element comprising with a sniffer of the one or more sniffers; and,
    (b) said detection and reporting member reporting one or more users' preference to said intermediate element.

3. A network as recited in claim 1, wherein:
    (a) said multicast element, said transmission medium and said detection and reporting member are contained in a Broadband Loop Carrier.

4. A network as recited in claim 1, further including:
    (a) a management element for managing the content delivery network, said management element being operably connected to said detection and reporting member for receiving and processing one or more users' preference of content generated by said detection and reporting member.

5. A network as recited in claim 3, wherein:
(a) a management member is operably connected to said multicast element, said management member instructs said multicast element what additional channels if any should be added to a set of content transmitted downstream from said multicast element.

6. A network as recited in claim 3, wherein:
(a) a management element includes a content manager, an access manager and a content correlation engine.

7. A network as recited in claim 1, further including:
(a) means for detecting content Content Description and its respective timing.

8. A network as recited in claim 1, wherein:
(a) means for recognizing user input from the one or more users to perform each of the following:
(i) implementing smart channel caching including adjacent channels or channels modeled to most likely to be selected next while one or more users are surfing;
(ii) prioritizing special events over historical requirements; and,
(iii) dropping unused channels.

9. A content delivery network for transmitting multiple channels of content; said network comprising:
(a) a multiple channel source for generating multiple channels of content;
(b) a user interface for receiving one or more user inputs from one or more users;
(c) a content and feedback processor for modifying content, in real time, provided to the one or more users based on the user input from the one or more users;
(d) at least one multicast element and a transmission medium operably connected to said at least one multicast element and to said multiple channel source, wherein each of said at least one multicast element containing said content and feedback processor;
(e) a plurality of sniffers including a sniffer in the content and feedback processor for detecting and reporting user input, wherein one of said sniffers being contained in said at least one multicast element, wherein one of said sniffers contained in a broadband loop carrier, and wherein each said sniffers is configured to extract in real time said one or more user input using Internet Group Managed Protocol (IGMP) functionality;
(f) a service analysis and management analysis system configured to receive the user input from the one or more users and to provide statistical reports of content utilized by each of the one or more users, wherein said service analysis and management analysis system is further configured to correlate the user input and content description to create statistical databases and report of the one or more users behaviors of a specific set of one or more users, wherein said service analysis and management analysis system utilizes filtering to filter out certain recognizable behavior patterns that are not relevant to the collection of viewer preference reports, wherein said service analysis and management analysis system is separate from said user interface and wherein said service analysis and management analysis system is configured to detect access violations comprising one of adding an unauthorized user interface, pulling content not part of a service profile, and parental controls; and
(g) multicast management element connected to each of said at least one multicast element, the transmission medium, and said multiple channel source, wherein said multicast management element sets content from the multiple channel source through the transmission medium to the at least one multicast element responsive to user feedback.

10. A network as recited in claim 9, wherein:
(a) said content and feedback processor modifies a specific content channel in response to user input to accomplish at least one of the following:
(i) provide user questionnaires;
(ii) to generate auto attendants to solicit user feedback;
(iii) to generate artificial intelligence companions for one or more users;
(iv) for execution of a game that one or more users participate in real time;
(v) implement video on demand;
(vi) implement personal video recorder services; and,
(vii) provide picture-in-picture.

11. A method of managing a content delivery network having a multiple channel source and a user interface for receiving one or more user inputs from one or more users; said method including the steps of
(a) detecting, in real time, one or more users' preference based on the user input from the one or more users, wherein said detecting is performed by at least one multicast element and a transmission medium operably connected to said at least one multicast element and to said multiple channel source, and a plurality of sniffers including a sniffer contained in a broadband loop carrier for detecting and reporting user input, wherein sniffers of said plurality of sniffers also being contained in said at least one multicast element and a content and feedback processor, and wherein each of said plurality of sniffers is configured to extract in real time said one or more user input using Internet Group Managed Protocol (IGMP) functionality;
(b) processing the user input from the one or more users, wherein said processing step further comprises filtering out recognizable behavior patterns not relevant to managing the content delivery network, and wherein said processing performed by a service analysis and management analysis system separate from said user interface; and,
(c) instantly, on aggregate, or as statistically predicted to be needed periodically, performing each of the following based on said processing step:
(i) managing the availability of one or more channels from the multiple channel source;
(ii) executing one or more specific instructions based on user input providing feedback relating to one or more options that are presented or available to the one or more users;
(iii) generating a report providing information relating to the one or more user inputs from the one or more users; and
(iv) correlating the user input and content description to create statistical databases and report of the one or more users behaviors of a specific set of one or more users.

12. A method as recited in claim 11, further including the step of:
(a) providing a viewer profile such that when a particular user is viewing content and provides user input, the particular user may be identified and associated with the user input.

13. A method as recited in claim 11, further including the step of:
(a) filtering out user inputs from the one or more users that are not relevant to a corresponding predetermined criteria.

14. A method as recited in claim 11, further including the step of:
(a) detecting access violations from the real time user input from the one or more users, wherein said access violations comprising one of adding an unauthorized user interface, pulling content not part of a service profile, and parental controls; and,
(b) prompting the one or more users regarding the access violation.

15. A method as recited in claim 11, further including the steps of:
(a) providing content to the one or more users that presents to the user a selection to execute a specific instruction;
(b) detecting in real time the one or more users' response to the providing step of sub-paragraph (a) of this claim; and,
(c) providing information to a Content Provider or third party regarding the one or more users' response detected in the detecting step of sub-paragraph (b) of this claim.

16. A method as recited in claim 11, further including the step of:
(a) reporting information to a Content Provider, or a Third Party corresponding to real time user input.

17. A network as recited in claim 1, further including:
(a) a first transmission medium connecting said multiple channel source to said user interface to transmit the content; and
(b) a second, broadband transmission medium separate from said first transmission medium, connecting said detection and reporting member to said multicast element for transmitting the one or more users' preference of content.

* * * * *